United States Patent [19]

Stückle

[11] Patent Number: 5,460,407
[45] Date of Patent: Oct. 24, 1995

[54] RESTRAINT SYSTEM FOR VEHICLE OCCUPANTS HAVING LASER IGNITION FOR AN AIR BAG GAS GENERATOR

[75] Inventor: Gerd Stückle, Hildrizhausen, Germany

[73] Assignee: Temic Telefunken microelectronic GmbH, Heilbronn, Germany

[21] Appl. No.: 231,691

[22] Filed: Apr. 25, 1994

[30] Foreign Application Priority Data

Apr. 26, 1993 [DE] Germany .................. 43 13 571.4

[51] Int. Cl.$^6$ ................................ B60R 21/26
[52] U.S. Cl. .................... 280/741; 102/201; 60/256; 422/165
[58] Field of Search ................ 280/741, 736, 280/728 R; 102/201; 60/256, 39.821; 422/165, 166

[56] References Cited

U.S. PATENT DOCUMENTS

| | | | |
|---|---|---|---|
| 3,167,015 | 1/1965 | Smith et al. | 102/201 |
| 3,362,329 | 1/1968 | Epstein | 102/201 |
| 3,791,302 | 2/1974 | McLeod | 102/201 |
| 3,812,783 | 5/1974 | Yang et al. | 102/201 |
| 4,149,466 | 4/1979 | Fojt et al. | 102/201 |
| 4,343,242 | 8/1982 | Welk | 102/201 |
| 4,455,941 | 6/1984 | Walker et al. | 102/201 |
| 4,547,342 | 10/1985 | Adams et al. | 280/741 |
| 4,711,466 | 12/1987 | Breed | 280/741 |
| 4,862,802 | 9/1989 | Streifer et al. | 102/201 |
| 4,878,690 | 11/1989 | Cunningham | 280/741 |
| 4,892,037 | 1/1990 | Betts | 102/201 |
| 4,917,014 | 4/1990 | Loughry et al. | 102/201 |
| 4,995,044 | 2/1991 | Blazo | 372/25 |
| 5,010,822 | 4/1991 | Folsom | 102/201 |
| 5,179,247 | 1/1993 | Hawley | 102/201 |
| 5,212,339 | 5/1993 | Piltch | 102/201 |

FOREIGN PATENT DOCUMENTS

| | | |
|---|---|---|
| 3838896A1 | 5/1990 | Germany . |
| 4010287C1 | 5/1991 | Germany . |
| 4010286C1 | 6/1991 | Germany . |
| 4026697C2 | 3/1992 | Germany . |
| 4211672A1 | 10/1993 | Germany . |
| 62-178457 | 8/1987 | Japan .................. 280/741 |

OTHER PUBLICATIONS

*Patent Abstracts of Japan,* Sec. M., vol. 12, No. 18 (M–660)(2865) Jan. 20, 1988.

*Primary Examiner*—Richard M. Camby
*Assistant Examiner*—Peter C. English
*Attorney, Agent, or Firm*—Spencer, Frank & Schneider; Christopher H. Lynt

[57] ABSTRACT

The invention relates to a restraint system for vehicle occupants with a gas cushion and a gas generator that fills the gas cushion and equipped with a solid-matter propellent charge as well as an electrically activated ignition device designed as a laser and provided in order to ignite the solid-matter propellent charge. To increase the functional reliability, the laser which is designed as a semiconductor laser is situated in an ignition chamber of the generator whose beam is aimed or guided directly onto the gas-generating solid-matter propellent charge at the time of ignition.

14 Claims, 2 Drawing Sheets

RESTRAINT SYSTEM FOR VEHICLE OCCUPANTS HAVING LASER IGNITION FOR AN AIR BAG GAS GENERATOR

BACKGROUND OF THE INVENTION

The invention relates to a restraint system for vehicle occupants with a gas cushion and a gas generator that fills the gas cushion and equipped with a solid-matter propellent charge as well as an electrically activated ignition device designed as a laser and provided in order to ignite the solid-matter propellent charge, as known from the generic JP 62-178 457 (A) on which it is based.

The generic JP 62-178 457 (A) on which the present invention is based relates to a restraint system for vehicle occupants with a gas cushion and a gas generator that fills the gas cushion. The propellent charge of the gas generator is ignited by an ignition charge. An ignition charge situated in the gas generator in an ignition chamber is activated by a beam aimed directly onto the ignition charge from a laser situated outside of the generator and where if necessary the laser beam is released through an apertured partition. When applied, i.e. the system has been activated but the laser beam does not yet ignite the propellent charge, the spring-loaded apertured partition held in this position by a latching arrangement masks off the laser beam from the ignition charge. However, in a design of this kind numerous components are needed. The total number of components required up to ignition of the propellent charge results in a long transmission chain which means that the response time between the detection of the event (accident) and the inflation of the gas cushion is very long. The number of components also has the disadvantage that the greater the number the greater the probability of a component failing and hence the complete system too. Consequently, elaborate testing of the components is necessary.

From U.S. Pat. No. 5,010,822, the use of transmitting, reflecting and focussing components is known for guiding the beam from a laser that ignites a pyrotechnical system. By including these components, the steel of the laser situated outside of the chamber of the pyrotechnical system need not be joined to the ignition chamber along a straight line. In individual cases, this can facilitate installation in limited spaces. Furthermore, it is easier to blank off the laser in the activated quiescent state because only one of these components need be removed from the course of the beam or be modified.

From DE 42 11 672 A1, a safety belt for vehicle seats is known that is inflated like a hose in the event of an accident. The volume of gas required for inflation is generated by burning a propellent charge that is distributed uniformly along the length of the safety belt and where the propellent charge is ignited by an optical ignition pulse. To ensure that the propellent charge burns down approximately simultaneously along the length of the belt, the optical ignition pulse is split up and injected into the propellent charge at several points along the belt at once.

SUMMARY OF THE INVENTION

The object of the invention is to further develop the generic restraint system on which it is based in such a way that it can be reliably activated in as small a constructional space as possible with a minimum of fault-prone components which require time to operate.

This object is solved in accordance with the present invention in the restraint system for vehicle occupants by means of a gas cushion and a gas generator equipped with a solid-matter propellent charge for filling the gas cushion and by means of an electrically activated ignition device designed in the form of a laser for igniting the solid-matter propellent charge. This solution is characterized by said laser being a semiconductor laser, situated within an ignition chamber of the said gas generator, and whose beam is aimed or guided directly onto said gas-generating solid-matter propellent charge when said ignition takes place. By the use of semiconductor lasers, their installation in the ignition chamber of the generator and the direct irradiation of the semiconductor laser beam for igniting the propellent charge, the gas generator of the gas cushion can be made more reliable and fit in a small space.

In a first embodiment of the invention, transmissive and/or reflective elements are provided to introduce the beam of the laser into a propellent charge chamber filled with the solid-matter propellent charge.

In a further embodiment of the invention, a focussing device is situated in the housing of the gas generator allowing the beam of the laser to be focussed directly on the propellent charge.

It is advantageous for the laser to be made up of several semiconductor lasers arranged one next to the other in a matrix.

In a further embodiment, the laser light can be irradiated onto the propellent charge distributed symmetrically with respect to the symmetry axis of the propellent charge.

Another feature of the invention is that the laser can be operated in pulsed mode.

The propellent charge is coated with a substance that at least partially absorbs the beam of the laser.

The invention will now be described below on the basis of the design examples shown in the drawings.

DESCRIPTION OF THE PREFERRED EMBODIMENTS

Figure 1:
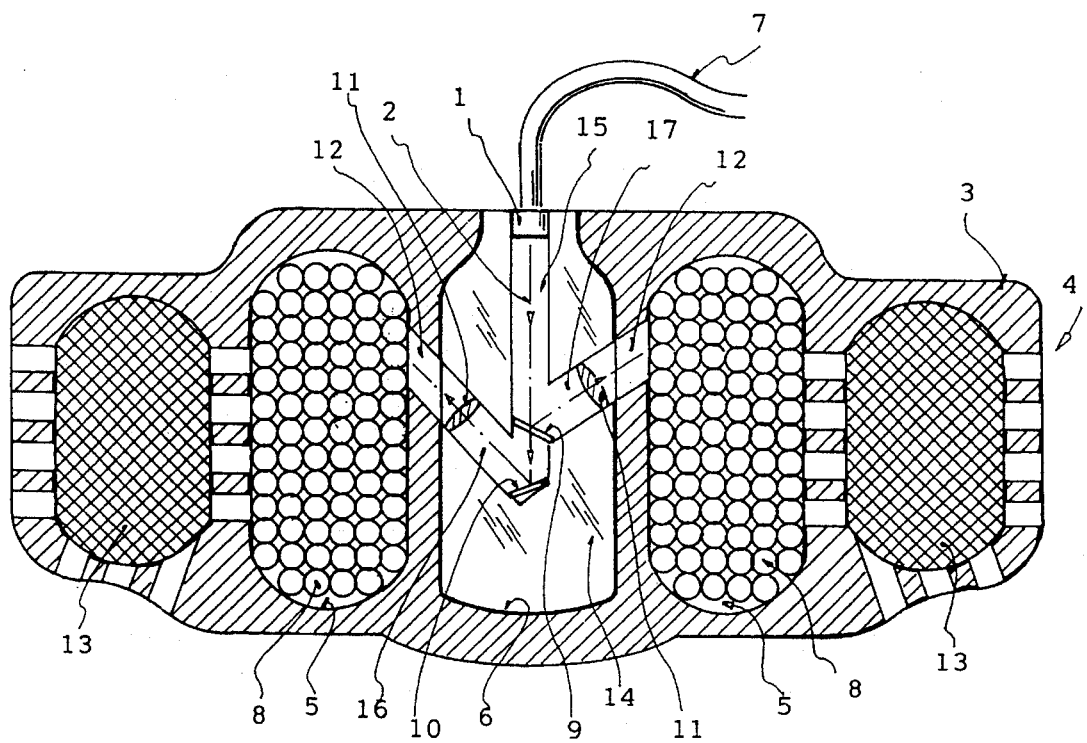
FIG. 1 shows a section through a gas generator of a restraint system on the driver side.

FIG. 1 represents a section through a gas generator 4 of a restraint system for vehicle occupants designed to fill a gas cushion (not shown in the drawing). This gas generator 4 on the driver's side is of the type fitted in the steering wheel impact absorber (not shown in the drawing). The gas generator 4 has a housing 3 with rotational symmetry about its longitudinal axis and in which there are situated, starting from the inside and going to the outside, an inner cylindrical ignition chamber 6, within which a glass body 14 is arranged, a middle propellent charge chamber 5 of annular shape filled with a propellent charge 8 made from compacted tablets, and an outer filter chamber, also of annular shape, which contains a steel filter 13 of steel mesh. The laser 1 is mounted on a flange within the ignition chamber 6 in the region of an axial face of the gas generator 4 in line with the longitudinal axis of the gas generator 4.

The operating voltage of the laser 1, designed appropriately as a semiconductor laser and referred to below simply as laser 1 for simplification, can easily be supplied from the vehicle's electrical system. Modern semiconductor lasers have short response times in the picosecond range thus allowing them to be pulsed with low response times and hence provide high performance operation. Owing to the short response time and the high pulse rate, it is possible to produce within short times extremely high radiation density and a high temperature resulting in a large amount of heat being applied to the tablets of propellent charge 8. Since these lasers 1 require only a small amount of space, it is advantageous to arrange several such lasers 1 on a matrix and by means of a suitable optical system to focus their entire laser light for ignition because the energy that. is then available for ignition is high. The lasers 1 concerned here thus offer the additional advantage compared with other lasers that in the event of not being used no additional measures are called for in order to shield the propellent charge 8 from beam 2 of laser 1.

The glass body 14, which has. several optical waveguide holes 15, 16, 17, is situated inside the ignition chamber 6. In the common optical waveguide hole 15 of beam 2 of laser 1 coming from laser 1, said hole being aligned along the longitudinal axis, there is a beam divider 9 which deflects approximately one half of beam 2 of laser 1 into the first optical waveguide hole 17. The first optical waveguide hole 17 is directed radially outwards and at an angle to the longitudinal axis and through the beam passage aperture 12 it also passes through the wall between ignition chamber 6 and propellent charge chamber 8, In the first optical waveguide hole 16 there is a lens 11 that focusses the split and deflected beam 2 almost to a point in a position at which the solid-matter propellent charge comprising tablets is arranged. Due to this focussing, there is a very high beam spot density at the point where beam 2 strikes and consequently propellent charge 8 can ignite well. The residual beam 2 that has not been influenced by beam divider 9 falls on mirror 10 that is situated at the end of the common optical waveguide hole 15 and is aligned at an angle to the longitudinal axis, where said mirror 10, depending on the ease of manufacture, can also be a mirrored surface inclined with respect to the longitudinal axis. The residual beam 2 is deflected by this mirror 10 into the second optical waveguide hole 16 that is also arranged radially outwards and at an angle to the longitudinal axis. In this second optical waveguide hole 16 there is also a lens 11 that focusses the residual beam 2 through another beam passage aperture 12 on another position on the propellent charge 8, said position being situated at approximately the same axial height as the first beam 2 deflected by beam divider 9. This beam of laser 1 is symmetrically distributed on propellent charge 8 and results in good ignition throughout propellent charge 8. Because the laser beam(s) is/are conducted directly onto propellent charge 8, it is moreover possible to do without a chemical ignition charge thus saving one component compared with the previous sequence in triggering an airbag. Apart from this saving, it should also be noted that this results in a lower failure probability and a lower susceptibility to faults in the restraint system. Furthermore, the space required for installation is reduced and after ignition has taken place there are fewer products of reaction.

Figure 2:
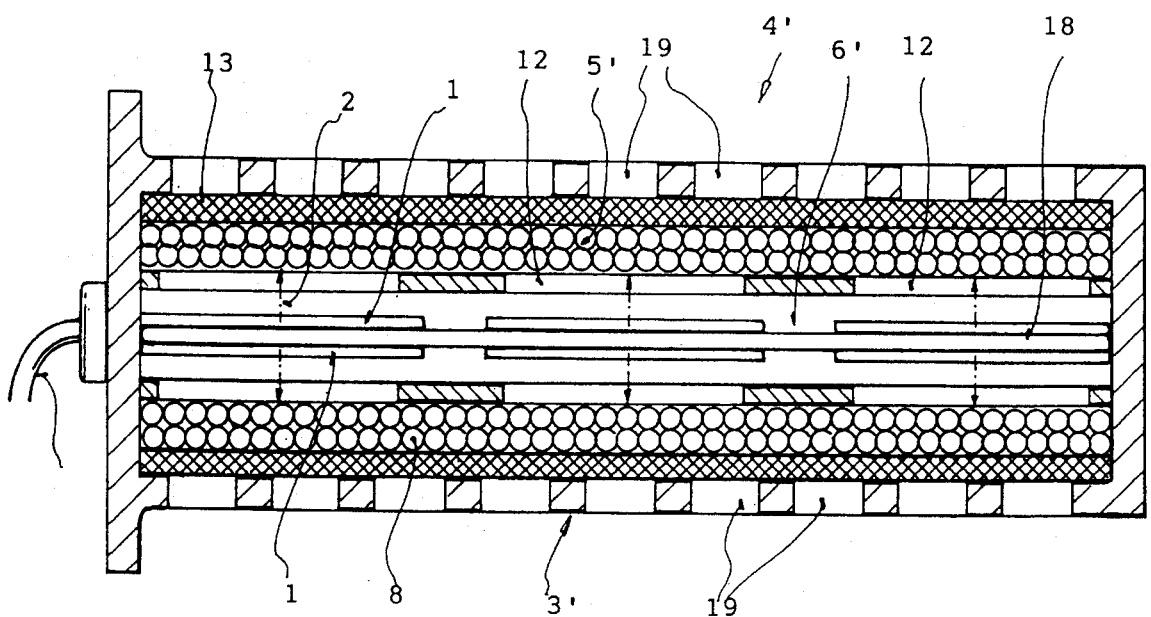
FIG. 2 a section through a gas generator of a restraint system on the passenger side.
Figure 3:
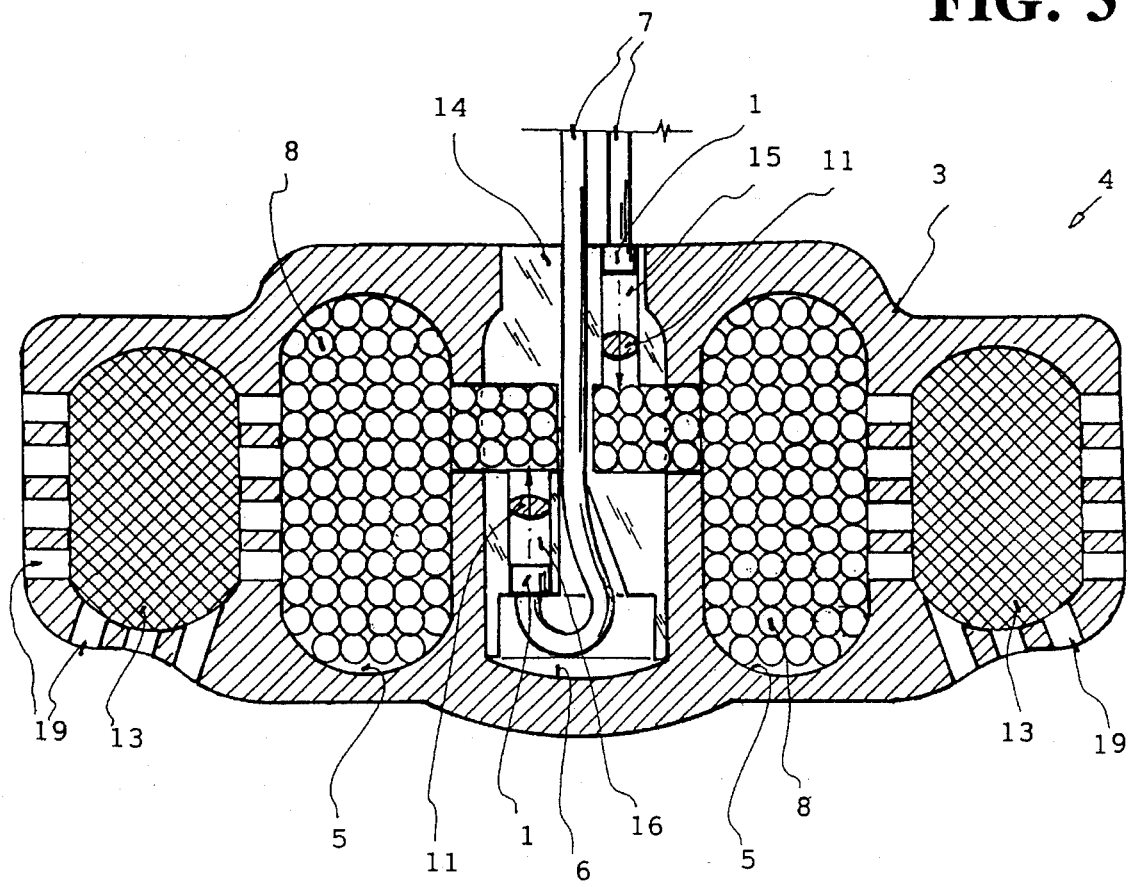
FIG. 3 is a section through another embodiment of the gas generator.

In accordance with a further embodiment shown in FIG. 3, a laser 1 can be arranged on each of two opposite face ends of ignition chamber 6 of gas generator 4. It is of advantage here that the optical waveguide holes in glass body 14 could be manufactured more simply because it is then possible to do without the beam divider 9 and consequently its attachment in an optical waveguide hole. Moreover, further tablets of propellent charge 8 could then be placed additionally in the ignition chamber 6. FIG. 2 shows a section through a gas generator 4' of a restraint system on the passenger side. The gas generator 4' is in the form of a long circular cylinder, where the ignition chamber 6' is arranged axially and the propellent charge chamber 5' radially on the outside. In this gas generator 4', the steel filter 13 is arranged around the tablets of propellent charge 8 within the propellent charge chamber 5' and gas passage apertures 19 are situated on the periphery of the housing 3' of gas generator 4' in order to fill the gas cushion.

In ignition chamber 6', a board 18 is situated along the longitudinal axis of the cylindrical housing 3', said board having several lasers 1 (semiconductor lasers) distributed on it. Consequently, this generator 3' also has no elements outside of generator 3' and is a unit of small size and high reliability. Moreover, the distances covered by beam 2 of laser 1 are short and therefore at the most only slight losses in laser power are to be expected since any absorption is at least of a negligible amount, The various lasers 1 are arranged radially opposite to the beam passage apertures 12 behind which the tablets of the solid-matter propellent charge 8 are stored in the propellent charge chamber 5'. If necessary, a focussing element (not drawn) can also be included here between the lasers 1 and the tablets in order to increase the beam spot density.

It makes good sense to supply and control the lasers 1 through the electrical conductors provided on board 18, where these conductors are connected to the external power supply of the vehicle through a conductor 7.

In principle, the two restraint systems shown function similarly and therefore the functional sequences that they have in common can be described briefly as follows. If the vehicle is involved in an accident, the crash sensor registers an intolerable acceleration and consequently a logic circuit initiates triggering of the restraint system(s). Through supply lines 7, laser(s) 1 is/are activated to pulsed operation and emits its/their laser beam(s) after the response and settling time. Beam 2 of the laser(s) 1 is guided either directly or indirectly towards the tablets in the propellent charge 8, it making good sense by means of suitable focussing devices such as lens or such like to aim the laser beam onto the propellent charge 8 in spot form and symmetrically in terms of the arrangement of propellent charge 8. The propellent charge 8 is heated up above the inertial temperature and reacts with strong formation of gas. The gas flows through the mesh of steel filter 13 and the filtered gas flows into the gas cushion that is then inflated completely within milliseconds.

In a further advantageous modification, the propellent charge (8) may be coated with a substance that at least partially absorbs the beam (2) of laser (1).

What is claimed is:

1. An air bag gas generator comprising:

a gas generator housing;

an ignition chamber disposed within said housing;

a laser disposed in said ignition chamber;

a propellant chamber, disposed within the housing, and communicating with the ignition chamber by at least one aperture;

a gas-generating propellant charge disposed within the propellant chamber; and laser beam directing means for directing a beam of light from said laser through said at least one aperture directly onto the gas-generating propellant charge;

wherein said at least one aperture comprises first and second apertures, and wherein the laser beam directing means comprises:
- an optical waveguide optically coupled to the laser to receive the laser beam therefrom;
- a beam splitter disposed in the optical waveguide, for receiving the laser beam from the laser and splitting the laser beam into first and second beam portions; and
- first and second focussing means, respectively disposed between said beam splitter and said first and second apertures, for focussing a respective one of the first and second beam portions directly onto said gas-generating propellant charge through said first and second apertures.

2. The air bag gas generator according to claim 1, wherein the ignition chamber comprises a cylindrical glass body disposed centrally along an axis of said housing.

3. The air bag gas generator according to claim 1, further comprising a filter chamber disposed in said housing between said propellant chamber and an outer edge of said housing, and a steel mesh filter material disposed within said filter chamber.

4. The air bag gas generator according to claim 1, wherein said gas-generating propellant charge is a solid-matter propellant charge.

5. The air bag gas generator according to claim 1, wherein said gas-generating propellent charge is coated with a substance that at least partially absorbs said beam of light from said laser.

6. The air bag gas generator according to claim 1, wherein the laser comprises an electrically activated pulsed semiconductor laser.

7. The air bag gas generator according to claim 1, wherein said laser comprises a matrix of semiconductor lasers.

8. The air bag gas generator according to claim 1, wherein the gas-generating solid-matter propellant charge has an axis of symmetry, and wherein the laser beam directing means directs the laser beam onto the gas-generating solid-matter propellent charge symmetrically with respect to the axis of symmetry of the gas-generating solid-matter propellent charge.

9. A restraint system for vehicle occupants comprising the gas generator according to claim 1 and a gas cushion filled by the gas generator.

10. An air bag gas generator comprising:
- a gas generator housing;
- an ignition chamber disposed within said housing;
- first and second electrically activated lasers disposed in said ignition chamber;
- a propellant chamber, disposed within the housing, and communicating with the ignition chamber by first and second apertures;
- a gas-generating propellant charge disposed within said propellant chamber, first and second portions of said gas-generating propellant charge extending through the first and second apertures, respectively, and into the ignition chamber; and
- laser beam directing means for directing first and second respective beams of light from said first and second lasers directly onto said first and second respective portions of said gas-generating propellant charge which extend through said first and second apertures into said ignition chamber.

11. The air bag gas generator according to claim 10, wherein the ignition chamber comprises a cylindrical glass body disposed centrally along an axis of said housing.

12. The air bag gas generator according to claim 10, wherein said laser beam directing means comprises first and second focussing means, respectively disposed between said first and second lasers and said first and second respective portions of said gas-generating propellant charge which extend into said ignition chamber through said first and second apertures, for focussing a respective one of the first and second beams of light directly onto said respective portions of said gas-generating propellant charge.

13. The air bag gas generator according to claim 12, further comprising a filter chamber disposed in said housing between said propellant chamber and an outer edge of said housing, and a steel mesh filter material disposed within said filter chamber.

14. A restraint system for vehicle occupants comprising the gas generator according to claim 10 and a gas cushion filled by the gas generator.

* * * * *